United States Patent [19]

Reid, Sr. et al.

[11] 3,774,494
[45] Nov. 27, 1973

[54] AUTOMATED RHYTHM TEACHING MACHINE

[75] Inventors: John Edgar Reid, Sr., Mundelein; Russell N. Muehleman, Mount Prospect, both of Ill.

[73] Assignee: said Reid by Said Muehleman

[22] Filed: June 19, 1972

[21] Appl. No.: 263,791

[52] U.S. Cl. ................................. 84/470, 84/484
[51] Int. Cl. ................................. G09b 15/00
[58] Field of Search ................. 84/470, 477, 478, 84/484

[56] References Cited
UNITED STATES PATENTS

| | | | |
|---|---|---|---|
| 3,456,546 | 7/1969 | Welsh et al. | 84/478 |
| 3,377,716 | 4/1968 | Schmoyer | 84/478 |
| 3,379,087 | 4/1968 | Weitzner | 84/478 |
| 3,577,824 | 5/1971 | Lavan | 84/478 |

Primary Examiner—Lawrence R. Franklin
Attorney—Benjamin H. Sherman et al.

[57] ABSTRACT

An automated rhythm teaching machine in the general form of a magnetic tape player employs digital circuits for monitoring a students attack and release against an attack and release standard carried on the magnetic tape and grades the performance of the student. In one embodiment the machine is adapted to hold the students exercise book which has printed rhythm exercise corresponding to the rhythm exercise magnetically recorded on the tape. In another embodiment, the rhythm exercise is both visually and magnetically recorded on the tape and projected in enlarged form upon a screen for the students use in performing the exercise.

20 Claims, 11 Drawing Figures

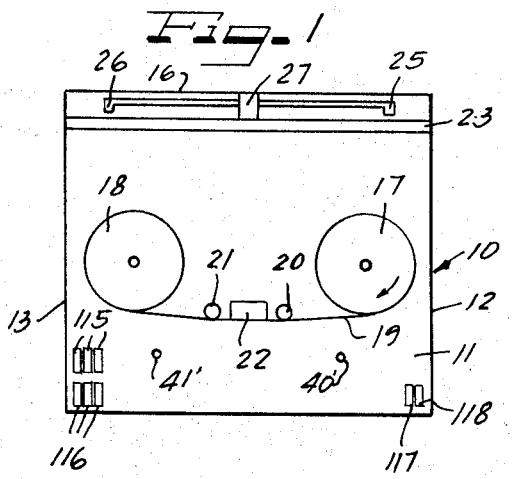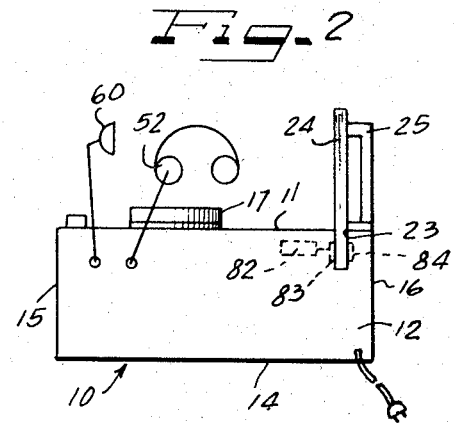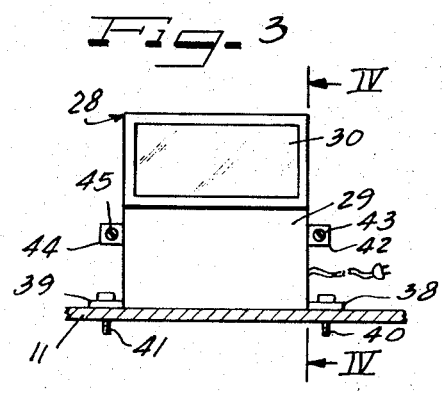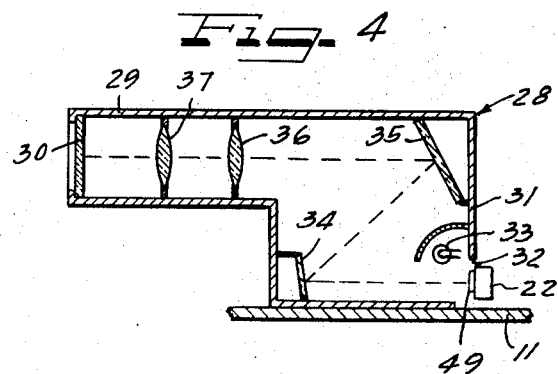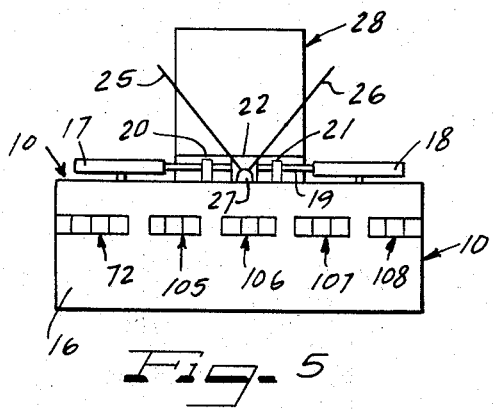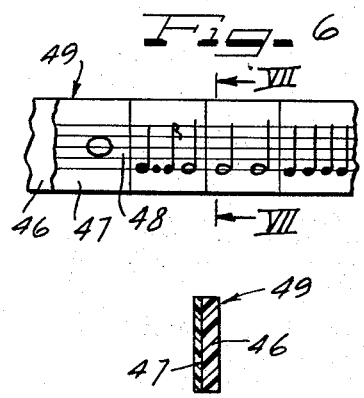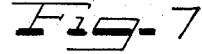

3,774,494

AUTOMATED RHYTHM TEACHING MACHINE

BACKGROUND OF THE INVENTION

1. Field of the Invention

This invention relates to automated rhythm teaching techniques and is particularly concerned with a magnetic tape player which includes circuits for monitoring and testing a student's performance of a rhythm pattern against a recorded standard.

2. Description of the Prior Art

U.S. Pat. No. 3,541,916 issued to John E. Reid, Sr. on Nov. 24, 1970 discloses a machine for teaching timing and rhythm to music students wherein the machine is electromagnetically operated to advance a rhythm indicating lamp across a rhythm pattern carrier at a smooth and even tempo under the control of the foot beat of the student. This machine is generally directed to primary music instruction and draws on the natural asset of the student's foot beat to teach correct note time durations at any desired tempo. A flashing lamp, operated in accordance with the rhythm sequence, is a deterrent to regressive reading and promotes the concept of a smooth, even and continuous tempo.

An automated rhythm training project reported by Walter Ihrke at Page 35 of the periodical "Journal of Research in Music Education," Volume 1, Spring, 1963, employed a printed manual, an electric organ, a stereo tape recorder for providing background music as an accompaniment and an electric rhythm monitor for reading early and later errors. Errors are indicated by signal lights visual to the student and the student has the option of repeating an item as many times as he wishes. An inaudible tape channel contains magnetic signals which the student is to match by playing on the organ keyboard. The tape signals and the keyboard signals are compared so that the student is given an immediate feedback by means of the signal lights. This system, however, requires that the student read the exercise and monitor the signal lights at the same time, a situation which may cause loss of perception in that the student should be reading ahead of his articulation while monitoring signal lamps which indicate the immediate past history.

SUMMARY OF THE INVENTION

An automated rhythm teaching machine is provided in the general form of a magnetic tape player wherein the magnetic tape contains at least two channels. In one channel at least an introductory metronome beat is recorded to condition the student to the proper tempo for a particular exercise. A rhythm pattern of the exercise is recorded in the second channel and corresponds to a printed rhythm exercise to be performed by the student. The exercise may be printed in an exercise manual or printed on a thin film carried by the tape, in registration with the magnetically recorded rhythm pattern, and projected in an enlarged scale for the students observation.

A third channel may be employed as an inaudible channel and carry a metronome pattern for forced operation of a foot pedal which carries the students foot as an aid in totally conditioning the student to the correct tempo. If an accompaniment or background music is not provided in the first channel, the introductory metronome thereof may be carried throughout the extent of the channel and employed in the place of the third channel to operate the foot pedal.

A particular feature of the invention prevents regressive reading and encourages the student to maintain the proper tempo, and to pickup and continue with the rhythm pattern in the event of error through confusion or the like, through the provision of the exercise printed and carried on the magnetic tape. As opposed to the exercise manual option, the magnetic tape passes out of view and the student can not regress to historical portions of the exercise.

The invention employs digital circuits for comparing the students response to a magnetically recorded rhythm pattern carried by the tape. Correct articulation of attack and release are counted and the count is registered on a visual display. Also, incorrect attacks and releases are counted and displayed. More specifically, early attack, late attack, early release and late release are respectively counted and displayed. The display is preferably provided at the rear of the machine out of the students view so that he may focus his attention to his performance.

Unlike the aforementioned automated training project, the students performance is received by a microphone so that the machine may be employed for teaching rhythm with respect to a wide variety of musical instruments.

It is therefore an object of the invention to provide an automated rhythm teaching machine which may be employed in teaching rhythm with respect to a wide variety of musical instruments.

Another object of the invention is to provide an automated rhythm teaching machine which promotes advance reading and comprehension and prevents regressive reading.

Another object of the invention is to provide an automated rhythm teaching machine which provides an audible accompaniment, including a preexercise metronome, to condition the student to the tempo of an exercise.

Another object of the invention is to provide an automated rhythm teaching machine in the general form of a magnetic tape player which includes electronic circuits for comparing a students performance with a recorded standard and grades the students performance in response to the comparision.

Another object of the invention is to provide an automated rhythm teaching machine which is adapted for use with an exercise manual having a corresponding exercise visually represented to the student.

Another object of the invention is to provide an automated rhythm teaching machine adapted for use with a magnetic tape which carries a magnetically recorded rhythm and a corresponding visually recorded rhythm.

BRIEF DESCRIPTION OF THE DRAWINGS

Other objects, features and advantages of the invention, its organization, construction and operation will be best understood from the following detailed description of preferred embodiments thereof taken in conjunction with the accompanying drawings, on which:

FIGS. 1 and 2 are respectively top and side views of a magnetic tape player constructed in accordance with the principles of the present invention;

FIG. 3 is a front elevation of a projector system for use in one embodiment of the invention;

FIG. 4 is a sectional view taken generally along the line IV—IV of FIG. 3;

FIG. 5 is a rear view of the magnetic tape player of FIGS. 1 and 2 shown with the apparatus of FIGS. 3 and 4 mounted thereon;

FIG. 6 is a plan view, in fragmentary form, of a magnetic tape carring a visual representation of a rhythm pattern which is magnetically recorded on the tape;

FIG. 7 is a sectional view taken generally along the line VII—VII of FIG. 6;

DESCRIPTION OF THE PREFERRED EMBODIMENTS

Figure 8:
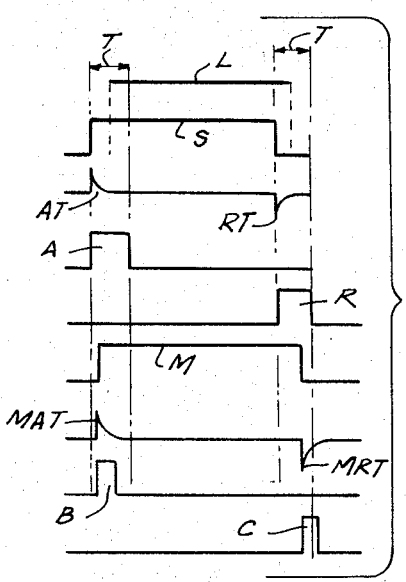
FIG. 8 is a representative pulse chart illustrating the signals generated in connection with FIGS. 9–11.

Generally speaking, FIGS. 1, 2 and 8–11 illustrate one embodiment of the invention and FIGS. 1–11 illustrate another embodiment of the invention, the overlap being readily understood from the following description.

Referring first to FIGS. 1 and 2, a magnetic tape player is generally referenced 10 and is illustrated as comprising a top wall 11, sidewalls 12 and 13, a bottom wall 14, a front wall 15 and a rear wall 16. A reel 17 of magnetic tape 19 is carried by a shaft and delivers the magnetic tape 19 to a second reel 18 during operation in the forward direction. During a rewind operation, tape is delivered to the reel 17 from the reel 18. The tape is guided by a pair of tape guides 20, 21 past a multi-track playback head 22. It should be noted here that the tape transport mechanism and switching features for forward operation, reverse operation automatic stop and the like which are well known in the tape recorder art may be employed in practicing the present invention. Inasmuch as such control apparatus is well known in the art, a detailed description thereof will not be given here.

The top wall 11 is provided with a groove 23 for receiving an exercise manual 24 or the like and cooperates with a pair of folding wires 25, 26 which are pivoted at 27, to act as a music stand.

A head set 52 is provided for the student to hear the audible channel and a microphone 60 is provided for receiving the notes played by the student.

Referring to FIG. 8, there is illustrated a pulse chart to aid in understanding the present invention. Assuming that a note of a rhythm sequence has the length L and that such length is to be magnetically recorded as a standard, and that the student is to be given a certain degree of tolerance so that he need not be absolutely and instantaneously accurate for each attack and release, the length L is recorded on the magnetic tape 19 as a pulse S displaced in a leading manner one half of the tolerance interval T. The pulse S therefore has leading and trailing edges which define the earliest permissible attack and the earliest permissible release. If the leading and trailing edges of the pulse S are differentiated there results a positive going pulse for the leading edge and a negative going pulse for the trailing edge, each of which pulses may be employed to operate respective pulse generators for generating pulses having a width equal to the tolerance interval T. This may be seen by referring to the pulses AT and RT which are employed as trigger pulses for generating the attack tolerance pulse A and the release tolerance pulse R in FIG. 8.

Similarly, if the students response is provided as a pulse M of generally the same character as the standard pulse S, it to may be differentiated to provide trigger pulses MAT and MRT which are in turn utilized for generating the students attack and release response pulses BC, respectively. As will be seen below, it is advantageous to utilize the pulses AT, RT, MAT and MRT as trigger pulses for respective monostable multivibrators. It is further advantageous if the monostable multivibrators are adjustable so as to provide various widths of pulses for changing the tolerance interval T and the width of the response pulses B and C. It should be noted that the width of the pulses B and C should be held to a minimum so as to prevent an early attack or an early release from extending into the permissible tolerance interval because of excessive width of the response pulses.

Figure 9:
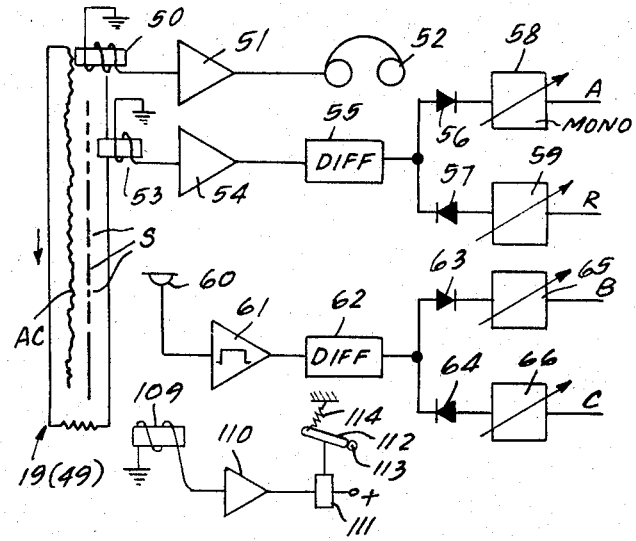
FIG. 9 is a schematic illustration of the intake of signals recorded on the tape and played by a student and the control signals generated in response thereto for practicing the present invention.

Referring to FIG. 9, the apparatus for utilizing the pulses illustrated in FIG. 8 is shown. The magnetic tape 19 having an audible channel AC and an inaudible channel, referenced by the standard pulses S, is shown moving in the direction of the arrow past a multi-track playback head. The playback head includes a first magnetic pickup 50 for receiving the information recorded in the audible channel AC, an amplifier for amplifying the signals received by the pickup head 50 and a pair of earphones 52 for rendering the signals audible to the student. A second channel on the tape has recorded therein the standard pulses S of the desired rhythm pattern, which corresponds to the exercise printed in the exercise manual 24. A pickup 53 is provided to transform the magnetically recorded signals into pulses which are amplified by an amplifier 54 and fed to a differentiator circuit. The differentiator circuit may be of any well known type and is operable to provide the pulses AT and RT of FIG. 8 at its output. The pulses AT are fed to a monostable multivibrator 58 by way of a correspondingly poled diode 56 and the pulses RT are fed to a monostable multivibrator 59 by way of a correspondingly poled diode 57. Circuits other than the oppositely poled diodes 56 and 57 may be employed to separate the trigger pulses AT and RT; however, the function of polarity discrimination, or inversion of one polarity, must be accomplished to separate the trigger pulses. The trigger pulse AT is effective to trigger the monostable multivibrator 58 to provide the output pulse A, while the monostable multivibrator 59 is triggered in response to the pulse RT to provide the output pulse R of FIG. 8.

The student response pulses B, C are derived in a similar manner. The notes played by the student are received by the microphone 60 which acts as a transducer to feed corresponding electrical signals to a shaping amplifier 61. The shaping amplifier may be of the type having a low voltage response threshold and operable to go in and out of saturation in response to the received signal envelope passing through the response threshold. The result is a shaped output pulse M of FIG.

8. The students shaped pulse M is fed to a differentiator 62 where it is differentiated to provide the pulses MAT and MRT of FIG. 8. These pulses are fed respectively by way of the diodes 63 and 64 to trigger respective monostable multivibrators 65 and 66 to provide the student response pulses B and C.

In order to read and compare the outputs of the multivibrators 58, 59, 65 and 66, apparatus is provided to count acceptable and poor responses. One form of such apparatus may be seen in FIG. 10 wherein a first AND gate 67 checks the student attack response B with respect to the attack standard pulse A and an AND gate 68 checks the student release response C with respect to the response standard pulse R. If either of these comparisions is true, the output of the corresponding AND gate is effective to operate an OR gate 69 and trigger a counter 70. The output of the counter 70 is read by a decoder 71 to operate a visual display 72. Binary pulse counters, decoders and display devices are well known in the art and need no further explanation here.

If a display of the number of poor responses is also required, the same may be had by utilizing the AND gates 85, 86, an OR gate 87, a counter 88, a decoder 89 and a display device 90. The AND gate 85 becomes true if the student's attack occurs outside of the permissible tolerance interval T as reflected by the pulse A. Similarly, the gate 86 becomes true if the students release response is generated outside of the tolerance reflected by the release pulse R. If the number of poor attacks and/or the number of poor releases are also required as separate displays, the same may be had by connecting to an output 91 and/or to an output 92 a respective counter-decoder-display arrangement such as illustrated at elements 88-90.

Figure 10:
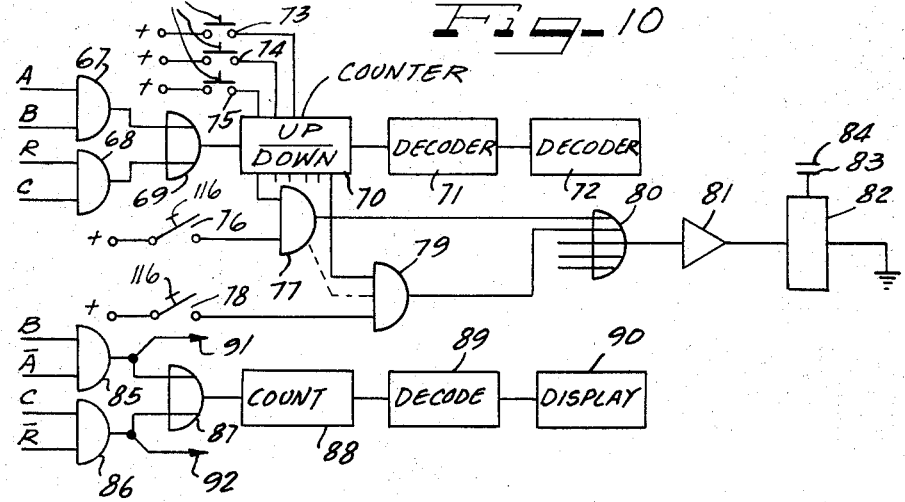
FIG. 10 is a schematic logic diagram of apparatus for comparing the output signals of FIG. 9 and counting good and bad attack and release.
Figure 11:
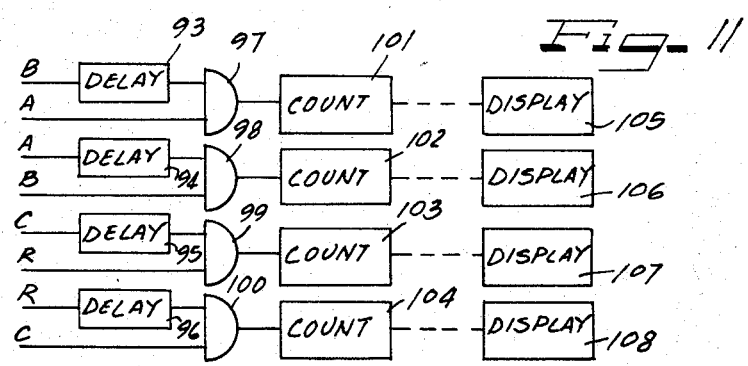
FIG. 11 is a schematic logic diagram of comparision, counting and display apparatus for deriving a numerical display of early attack, late attack, early release and late release in response to the signals generated by the apparatus of FIG. 9.

Referring to FIG. 11, if a complete display of correct responses and the particular type of incorrect attack and release are to be displayed, the apparatus may include in place of the elements 85-90 of FIG. 10, the apparatus illustrated in FIG. 11. For example, if the student'attack response D is early and can be delayed to fall within the tolerance defined by the attack pulse A by means of a delay circuit 93, an AND gate 97 reads the coincidence of the pulse A and the delayed pulse B and operates a counter 101 which, through a decoder that is not shown, operates a display 105. The display 105 therefore displays the count of the number of early attacks. In a similar manner the delay circuits 94-96, the AND gates 98-100, the counters 102-104 and the displays 106-108 respectively display the numbers of occurrences of late attack, early release and late release. The delay circuits 93-96 may be of any well known type, such as delay lines and the counter-decoder-display apparatus may, of course, be of any well known type.

Referring again to FIG. 10, a plurality of switches 73-75 are illustrated as providing inputs to the counter 70. As is well known in the art, certain counter configurations may be preset to a particular count. The switches 73-75 serve this purpose. One portion of the counter 70 may therefore be designed as a simple 1-2-4-8 type counter and count upwardly for decoding and display, while another portion of the counter may be preset to a particular number and count downwardly in response to the pulses from the OR gate 69. In this latter-mentioned portion of the counter, the operation of one of the switches 73-75 will preset the counter to the number of attacks and releases in the particular exercise, such number being designated by a letter code on the tape reel for the students use. Another code designation will also appear on the tape reel and relates to the percentage of attacks and releases which will signify satisfactory performance. If, for example, the number of attacks and releases is 500 and the passing percentage is seventy percent, then 350 attacks and releases should be performed within the tolerance intervals. Assuming that the switch 75 has been operated to represent 500 counts, the counter stage representing a count down of 350 will have associated therewith the AND gate 77. The second code for the student's use would therefore have directed him to operate a key to close the switch 76 to that when the count of 350 is reached, the AND gate 77 becomes true, rendering an OR gate 80 true to operate a solenoid driver 81 and its solenoid 82. The soldenoid 82 includes a punch or solenoid 82. The soldenoid 82 includes a punch or printing head 83 which is forced toward an anvil 84. In FIG. 2 the solenoid 82 with its anvil 83 is illustrated as being disposed on one side of the groove 23 while the anvil 84 is disposed on the other side of the groove 23 and may physically be provided by the wall of the groove and the exercise manual itself rather than as a separate physical element. Operation of the solenoid 82 therefore imprints a satisfactory mark on the students exercise manual. For each code setting switch 73-75 there is, therefore, a corresponding AND gate 77-79 and code switch 76-78. Operation of a switch 73-75 not only presets one portion of the counter 70, but resets the forward counting portion. Reset and preset type counters are well known in the art and should not require further explanation at this time. Particular reference to a preset type counter may, however, be found in U.S. Pat. No. 2,536,035, issued Jan. 2, 1951.

Referring again to FIG. 9, apparatus is illustrated for operating a foot pedal in response to a metronome recorded in a third channel, or in the audible channel if an accompaniment is not provided in that channel. The apparatus includes a pickup 109 which feeds the metronome voltage impulses to an amplifier 110 which functions as a driver for a solenoid 111. The solenoid 111 has a foot pedal 112 connected thereto which is pivoted at 113 and spring loaded at 114. The metronome therefore conditions the student to the proper tempo and separates the influence of the printed rhythm and the tempo so that the student does not attempt to follow the rhythm with his foot beat.

A second embodiment of the invention is illustrated in FIGS. 1-11 and, inasmuch as FIGS. 8-10 have already been thoroughly covered above, the description of this embodiment will be limited to FIGS. 1-7.

FIG. 6 illustrates a magnetic tape 49 having a layer 46 which is a conventional magnetic recording tape. A second layer 47, preferably a light or white color plastic, such as Mylar, is carried by the layer 46 and bonded thereto and in turn carries a musical notation 48 thereon of a rhythm pattern corresponding to the rhythm pattern magnetically recorded in substantial registration therewith on the tape 46.

Inasmuch as it would be difficult for a student to read a narrow moving tape, such as a ¼ inch tape, the rhythm teaching machine is provided with a projector system such as illustrated in FIGS. 3 and 4. The projector 28 comprises a housing 29 having a projection screen 30 mounted at the forward end thereof. The housing 29 includes a rear wall 31 which defines an opening 32 to be positioned adjacent the magnetic tape 49 as it passes the playback head 22. The housing is also provided with a lamp 33 for illuminating the tape as it traverses the opening 32 so that the same will be projected by means of a pair of mirrors 34, 35 and a lens system 36, 37 to the projection screen 30. The provision of the lens system 36, 37 and/or the mirror system 34, 35 provides for an enlarged view of the tape. The morror 34 may be, for example, a convex mirror. The projector includes a pair of tabs 38, 39 having respective fastening means, such as screws 40, 41 for securing the same to the top wall 11 of the tape player in the corresponding threaded holes 40', 41'.

The projector 28 is also adapted for use with a tape player of the cartridge type, wherein the cartridge has a window in the outwardly projecting end thereof and means for reversing the tape by tape guides or the pattern image by mirrors. The magnetic pattern is recorded leading an appropriate amount to compensate for the displacement of the visual pattern vis-a-vis the playback head, and a pair of tabs 42, 44 with respective screws 43, 45 are provided for connecting the projector to the front of the cartridge player.

The tape reel or the tape cartridge is provided with a label which notes the exercise and provides the student with an instruction for keying in the code letter representing the number of attacks and releases and a code letter for keying in the acceptable percentage corresponding to the particular number of attacks and releases. Such keying selectively operates the switches 73–75 and 76–78 as representative of the two codes and is accomplished by selectively depressing the push buttons 105, 106. To operate the machine the student places a reel of tape on the machine or a cartridge in a comparable cartridge player, positions the exercise manual 24 in the groove 23 if such a manual is being used, keys in the codes for the number of attacks and releases and the passing percentage associated therewith for operating the solenoid 82, puts on the headset 52, and presses the start button 107. The start button 107 is associated with the tape drive mechanism and causes movement of the tape in the forward direction. The machine may be provided with an automatic stop mechanism, as is well known in the art and rewinding may be accomplished by depressing the push button 108 to rewind the tape.

Although the invention has been described by reference to specific illustrative embodiments thereof, many changes and modifications of the invention may become apparent to those skilled in the art without departing from the spirit and scope thereof, and it is therefore intended that the patent warranted hereon cover all such changes and modifications as may reasonably and properly be included within the scope of this contribution to the art.

We claim:
1. Rhythm teaching apparatus comprising:
   a visual musical exercise means including sheet material having a rhythm pattern of notes printed thereon having attacks and releases;
   a magnetic recording including a first channel having signals recorded corresponding to the exercise rhythm pattern, and a second channel having metronome signals recorded at least for an introduction to the exercise to condition a student to the correct tempo;
   first means to read said first channel and operable in response to the signals recorded in said first channel to provide attack and release standard signals each having a width corresponding to a predetermined tolerance interval;
   second means to read said second channel and operable to provide the student with an audible representation of signals recorded in said second channel;
   third means receiving sounds played by a student and operable in response thereto to produce signals corresponding to the student attack response and the student release response;
   fourth means connected to said first and third means, said fourth means operable in response to coincidence of student response and standard attack signals and coincidence of student response and standard release signals to indicate such coincidence;
   means for holding said visual exercise means; and
   fifth means mounted adjacent said holding means and responsive to a predetermined number of student response and standard coincidences to mark said sheet material.

2. Rhythm teaching apparatus according to claim 1, wherein said first and third means each include respective pulse means operable in response to signals recorded in said first channel and note sounds played by the student, respectively, to provide corresponding attack and release standard pulses and student attack and release response pulses, and said fourth means includes attack comparison means for sensing the occurrence of a student attack response pulse within the predetermined interval of an attack standard pulse, and release comparison means for sensing the occurrence of a student release response pulse within the predetermined interval of a release standard pulse.

3. Rhythm teaching apparatus according to claim 2, wherein said fourth means further comprises counting means operated by each of said attack comparision means and release comparison means to count the number of student attack and release responses occurring within the respective predetermined tolerance intervals.

4. Rhythm teaching apparatus according to claim 3, wherein said fourth means includes display means connected to said counting means for displaying the count thereof.

5. Rhythm teaching apparatus according to claim 4, wherein said fourth means further includes means for sensing early and late relationships between student response pulses and standard pulses, other counting means for counting such relationships, and other display means for displaying the content of said other countings.

6. Rhythm teaching apparatus according to claim 1, wherein said magnetic recording is a magnetic tape and said visual exercise means comprises a second tape bonded to and carried by said magnetic tape and has said rhythm pattern printed thereon in substantial registry with the corresponding signals recorded in said first channel.

7. Rhythm teaching apparatus according to claim 6, comprising a projector including a projection screen, said projector disposed adjacent said second tape and including means for illuminating said second tape and means for projecting an enlarged image of said second tape on said screen.

8. Rhythm teaching apparatus according to claim 1, wherein said first means comprises a second channel pickup device for providing the rhythm pattern signals as electrical voltage signals, amplifier means connected to said second channel pickup device, a differentiator connected to said amplifier means for providing trigger pulses in response to the attack and release standards represented by the electrical voltage signals, and pulse means operable in response to said trigger pulses to produce said attack and release standard signals as pulses having a width corresponding to said predetermined tolerance interval.

9. Rhythm teaching apparatus according to claim 8, wherein said pulse means includes monostable multivibrator means.

10. Rhythm teaching apparatus according to claim 8, wherein said pulse means includes adjustable monostable multivibrator means for adjusting said predetermined tolerance interval.

11. Rhythm teaching apparatus according to claim 1, wherein said third means comprises a microphone for changing the student played note sounds to corresponding electrical voltage signals, amplifier means connected to said microphone, a differentiator connected to said amplifier means for providing trigger pulses in response to each attack and release represented by said electrical voltage signals, and pulse means operable in response to said trigger pulses to produce said student attack and student release response signals as student attack response pulses and student release response pulses.

12. Rhythm teaching apparatus according to claim 11, wherein said pulse means includes monostable multivibrator means.

13. Rhythm teaching apparatus according to claim 11, wherein said pulse means includes adjustable monostable multivibrator means for providing adjustable pulse width for said student attack and release response pulses.

14. Rhythm teaching apparatus according to claim 1, wherein said second means includes a second channel puckup device, a headset type transducer and amplifier means connecting said transducer to said second channel pickup device.

15. Rhythm teaching apparatus comprising:
a visual musical exercise means including a rhythm pattern of notes having attacks and releases;
a magnetic recording including a first channel having signals recorded corresponding to the exercise rhythm pattern, and a second channel having metronome signals recorded at least for an introduction to the exercise to condition a student to the correct tempo;
first means to read said first channel and operable in response to the signals recorded in said first channel to provide attack and release standard signals each having a width corresponding to a predetermined tolerance interval;
second means to read said second channel and operable to provide the student with an audible representation of signals recorded in said second channel;
third means receiving sounds played by a student and operable in response thereto to produce signals corresponding to the student attack response and the student release response;
fourth means connected to said first and third means, said fourth means operable in response to coincidence of student response and standard attack signals and coincidence of student response and standard release signals to indicate such coincidence; and
a foot pedal for receiving a foot of the student, said second means including means for operating said foot pedal in response to metronome signals.

16. Rhythm teaching apparatus according to claim 15, wherein said magnetic recording is a magnetic tape and said visual exercise means comprises a second tape bonded to and carried by said magnetic tape and having said rhythm pattern printed thereon in substantial registry with the corresponding signals recorded in said first channel.

17. Rhythm teaching apparatus according to claim 16, comprising a projector including a projection screen, said projector disposed adjacent said second tape and including means for illuminating said second tape and means for projecting an enlarged image of said second tape on said screen.

18. Rhythm teaching apparatus comprising:
a visual musical exercise means including a rhythm pattern of notes having attacks and releases;
a magnetic recording including a first channel having signals recorded corresponding to the exercise rhythm pattern, and a second channel having metronome signals recorded at least for an introduction to the exercise to condition a student to the correct tempo;
first means to read said first channel and operable in response to the signals recorded in said first channel to provide attack and release standard signals each having a width corresponding to a predetermined tolerance interval;
second means to read said second channel and operable to provide the student with an audible representation of signals recorded in said second channel;
third means receiving sounds played by a student and operable in response thereto to produce signals corresponding to the student attack response and the student release response;
fourth means connected to said first and third means, said fourth means operable in response to coincidence of student response and standard attack signals and coincidence of student response and standard release signals to indicate such coincidence;
an exercise performance validation sheet;
means for holding said validation sheet; and
fifth means mounted adjacent said holding means and responsive to a predetermined number of said coincidences to place a validation mark on said validation sheet.

19. Rhythm teaching apparatus according to claim 18, wherein said magnetic recording is a magnetic tape and said visual exercise means comprises a second tape bonded to and carried by said magnetic tape and having said rhythm pattern printed thereon in substantial registry with the corresponding signals recorded in said first channel.

20. Rhythm teaching apparatus according to claim 19, comprising a projector including a projection screen, said projector disposed adjacent said second tape and including means for illuminating said second tape and means for projecting an enlarged image of said second tape on said screen.

* * * * *